(12) United States Patent
Dordoni

(10) Patent No.: US 8,197,245 B2
(45) Date of Patent: Jun. 12, 2012

(54) APPARATUS FOR MOLDING CONTAINERS OBTAINED FROM PARISONS

(75) Inventor: Claudio Dordoni, Parma (IT)

(73) Assignee: GEA Procomac S.p.A., Sala Baganza (IT)

( * ) Notice: Subject to any disclaimer, the term of this patent is extended or adjusted under 35 U.S.C. 154(b) by 179 days.

(21) Appl. No.: 12/768,410

(22) Filed: Apr. 27, 2010

(65) Prior Publication Data

US 2010/0272844 A1  Oct. 28, 2010

(30) Foreign Application Priority Data

Apr. 28, 2009  (EP) ..................................... 09425161

(51) Int. Cl.
*B29C 49/36* (2006.01)
*B29C 49/46* (2006.01)

(52) U.S. Cl. .................. 425/524; 425/522; 425/540

(58) Field of Classification Search .................. 425/522, 425/524, 540
See application file for complete search history.

(56) References Cited

U.S. PATENT DOCUMENTS

| | | | | |
|---|---|---|---|---|
| 4,208,852 A | * | 6/1980 | Pioch ............................ | 425/535 |
| 5,671,591 A | | 9/1997 | Fleenor | |
| 5,759,218 A | | 6/1998 | Martin et al. | |
| 7,393,373 B1 | | 7/2008 | Krippner et al. | |
| 7,396,225 B2 | * | 7/2008 | Hansen ......................... | 425/524 |
| 2006/0185321 A1 | | 8/2006 | Raynaud | |
| 2010/0089009 A1 | | 4/2010 | Till | |

FOREIGN PATENT DOCUMENTS

| | | | |
|---|---|---|---|
| DE | 102007017938 A1 | | 10/2008 |
| EP | 464933 A | * | 1/1992 |
| EP | 0741080 A1 | | 11/1996 |
| EP | 1445011 A1 | | 8/2004 |
| FR | 2882341 A1 | | 8/2006 |
| JP | 2000202895 A | * | 7/2000 |
| WO | WO 2008105253 A1 | * | 9/2008 |

* cited by examiner

*Primary Examiner* — Robert B Davis
(74) *Attorney, Agent, or Firm* — Pearne & Gordon LLP

(57) ABSTRACT

Molding apparatus (1) comprising:
a molding station (3) equipped with a machine (4) for molding containers (2) obtained from parisons of plastic material and drive components (5) of said machine (4);
an isolation device (6) for the molding machine (4), suitable for defining a controlled-contamination environment (7) for housing the machine (4), said drive components (5) being situated outside said environment (7);
at least one service section (19) having one or more points of access (19a) with seal-tight protection to enable adjustment, maintenance or size change operations to be performed inside the controlled-contamination environment (7);
molds (11) fixed to said machine (4);
tubular bodies (13) disposed partly inside and partly outside said environment (7), said tubular bodies (13) defining tubular cavities suitable for the passage of the drive components (5), in particular of drive members (12) for opening and closing the molds (11).

14 Claims, 6 Drawing Sheets

APPARATUS FOR MOLDING CONTAINERS OBTAINED FROM PARISONS

The present invention relates to an apparatus for molding containers obtained from parisons of plastic material. In particular, said apparatus finds application in the sector of bottling with aseptic technology.

As it is known, in a bottling line using aseptic technology, controlling contamination is of primary importance for the containers to be filled, the filling product and the environments in which molding and filling of the containers take place. In a bottling line using aseptic technology, it is in fact fundamental to ensure correct filtering of the gaseous fluids to be introduced into the controlled environment, correct management of the pressures in various zones so as to control the path of any undesirable particles, correct monitoring of the environment, and the correct management and adequate quality of the C.I.P. (Cleaning-in-Place) and S.I.P (Sterilization-in-Place) cycles.

Control of environmental contamination in bottling plants was introduced at the beginning of the nineteen-nineties with the adoption of "clean rooms", i.e. contamination-controlled rooms inside which machines (e.g. blowing and filling machines) were installed.

The main disadvantage of clean rooms is their considerable dimensions, necessary in order to house both the machines and their respective drives.

A further disadvantage of clean rooms regards the difficulty of carrying out size change operations or maintenance and adjustments of machine parts. Access to a clean room by personnel appointed to perform such operations is particularly critical and is permitted only if the operator is wearing a suitable mask, shoe covers, gown and cap, which must be sterile. Besides the risk of contamination, it must be considered that the time necessary to complete the operations may be rather long, thus resulting in a decrease in the productivity of the line. Considering the large number of operations each machine is required to undergo, on average, per year, the overall times and costs prove to be considerable.

Another disadvantage of clean rooms lies in the difficulty of assuring that contamination is maintained below a desired level due to the accumulation of lubrication oil and dust around the machine moving members. For example, it is known that blowing machines have blowing moulds which are made to open and close in order to receive the parison, mold the container and release the molded container. The drive components of the moulds (including the bottom element) are situated in the immediate vicinity of the moulds themselves. Since such components include, in particular, mechanical cams, pneumatic cylinders, hydraulic apparatus, sliding guides and electric motors, it is typically necessary to use lubricating substances, which results in an accumulation, in proximity to such components, of dirt or dust originating from wear. Therefore, the risks of environmental contamination are very high.

In this context, the technical task at the basis of the present invention is to provide an apparatus for molding containers obtained from parisons which overcomes the drawbacks of the above-mentioned known art.

In particular, it is an object of the present invention to provide an apparatus for molding containers obtained from parisons which is compact and in which it is easy to maintain environmental contamination below a desired level.

Another object of the present invention is to make available an apparatus for molding containers obtained from parisons, wherein the risks of contamination during maintenance, adjustment and size change operations are reduced compared to the known solutions or eliminated altogether.

A further object of the present invention is to provide an apparatus for molding containers obtained from parisons, wherein maintenance, adjustment and size change operations can be performed quickly.

The defined technical task and the specified objects hereof are substantially achieved by an apparatus for molding containers obtained from parisons which comprises the technical characteristics described in one or more of the appended claims.

Further characteristics and advantages of the present invention will become more apparent from the following approximate, and hence non-restrictive, description of a preferred, but not exclusive, embodiment of an apparatus for molding containers obtained from parisons, as illustrated in the appended drawings, in which.

Figure 1:
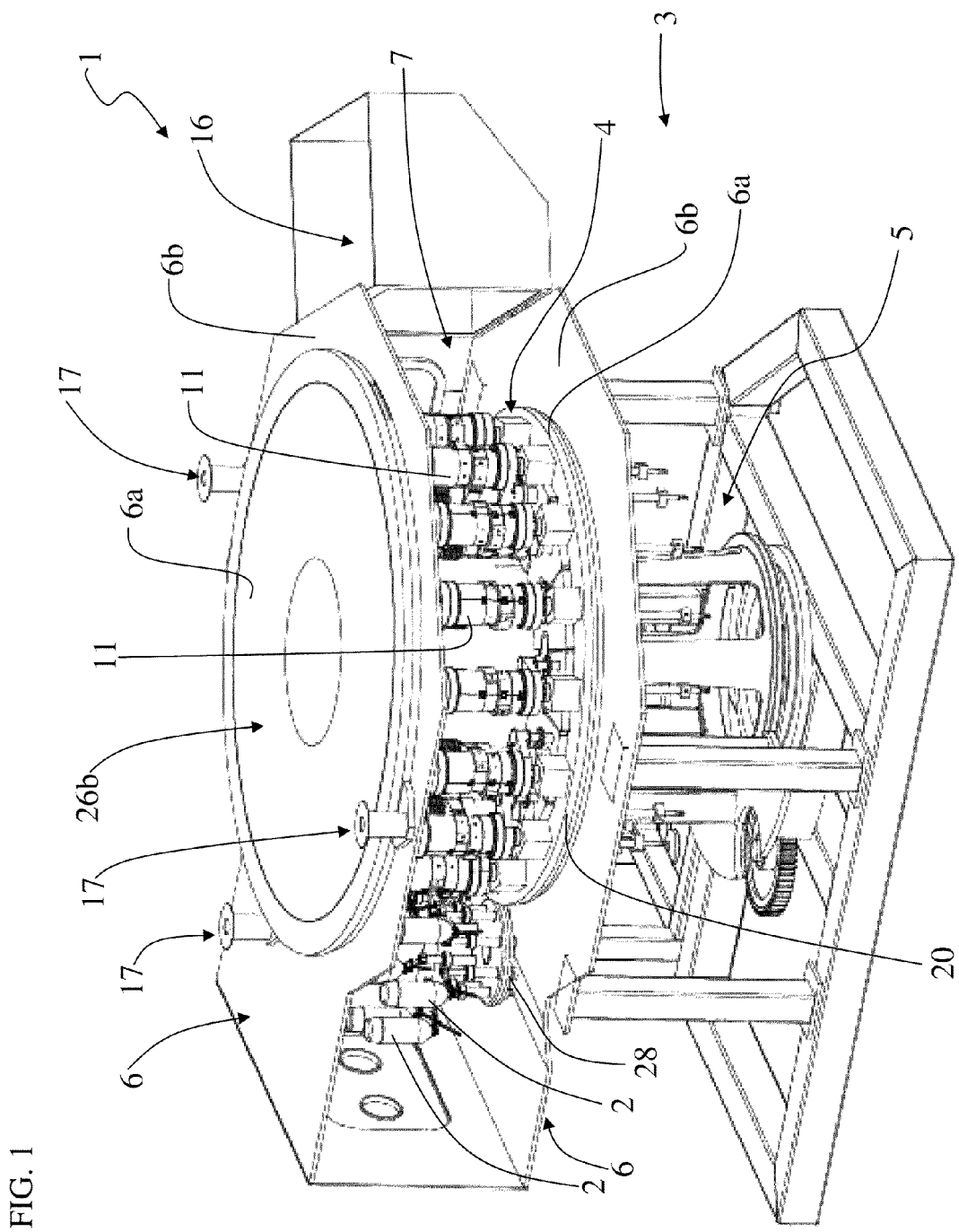
FIG. 1 illustrates a broken away view of an apparatus for molding containers obtained from parisons, according to the present invention.

With reference to the figures, 1 indicates an apparatus for molding containers 2 obtained from parisons of plastic material. The apparatus 1 provides for the presence of a molding station 3 equipped with a molding machine 4 and drive components 5 of said machine 4. Preferably, the molding machine 4 is a blowing machine. Said apparatus 1 comprises an isolation device 6 for the molding machine 4, serving to define a controlled-contamination environment 7 for housing said machine 4. The drive components 5 are situated outside said controlled-contamination environment 7. In particular, the apparatus 1 comprises tubular bodies 13 disposed partly inside and partly outside the environment 7. Said tubular bodies 13 define tubular cavities suitable for the passage of the drive components 5.

Preferably, the isolation device 6 is composed of a movable portion 6a and a fixed portion 6b. In particular, the movable portion 6a is integral with the molding machine 4.

In the embodiment described and illustrated here, the molding machine 4 is of the type with a rotary carousel 20. In this case, the movable portion 6a is integral with the rotary carousel 20. In another embodiment (not illustrated), the molding machine 4 is of the linear type.

Interposed between the movable portion 6a and the fixed portion 6b there is at least one seal member 10. More preferably, a plurality of seal members 10 are interposed between the portions 6a and 6b of the isolation device 6. Preferably, the seal members 10 are of the sliding contact or mechanical labyrinth type (dry seals or wet seals). Said seal members 10 are situated in a lower zone 26a, an upper zone 26b or else in a lateral zone 26c of the isolation device 6.

Figure 3:
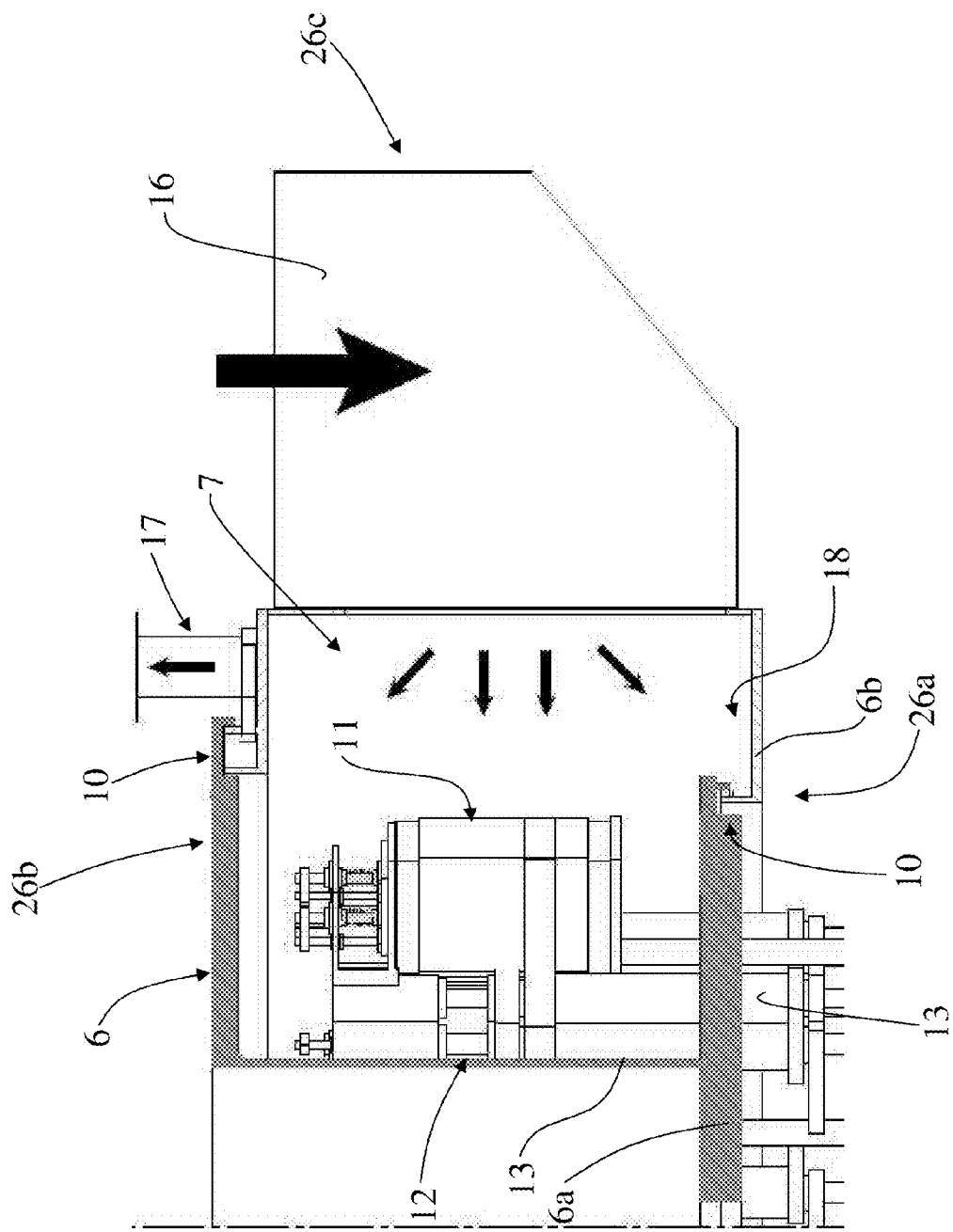
FIG. 3 illustrates a lateral cutaway view of a portion of the apparatus of FIG. 1.

As can be seen in FIG. 3, the isolation device 6 is provided with at least an inlet 16 and at least an outlet 17 for a gaseous fluid. In this manner, the gaseous fluid introduced through the inlet 16 is made to flow through the controlled-contamination environment 7 (the arrows indicate the flow of fluid). The inlet 16 is fitted with filters (e.g. high efficiency or HEPA filters) for filtering the gaseous fluid before it is introduced into the environment 7. Alternatively, or in addition, filters are fitted to a feed conduit (not illustrated) supplying the gaseous fluid.

Preferably, the inlet 16 and outlet 17 are dimensioned according to predefined mutual ratio so as to maintain the fluid at a predetermined pressure. In the embodiment described and illustrated here, the inlet 16, fashioned in the lateral zone 26c of the isolation device 6, has corresponding to it a plurality of outlets 17 fashioned in the upper zone 26b.

Figure 4:
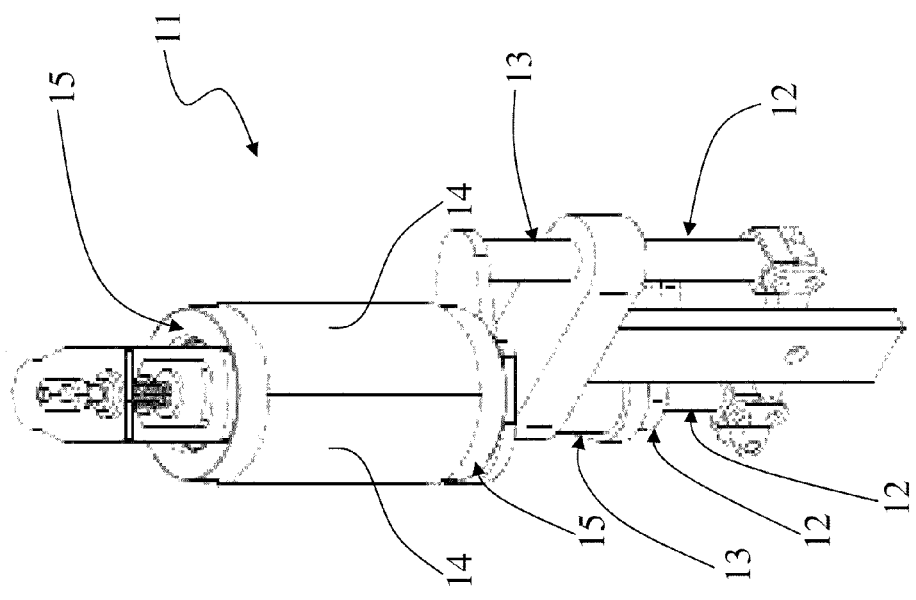
FIG. 4 illustrates a perspective view of a detail (mould) of the apparatus of FIG. 1, in an open position.
Figure 5:
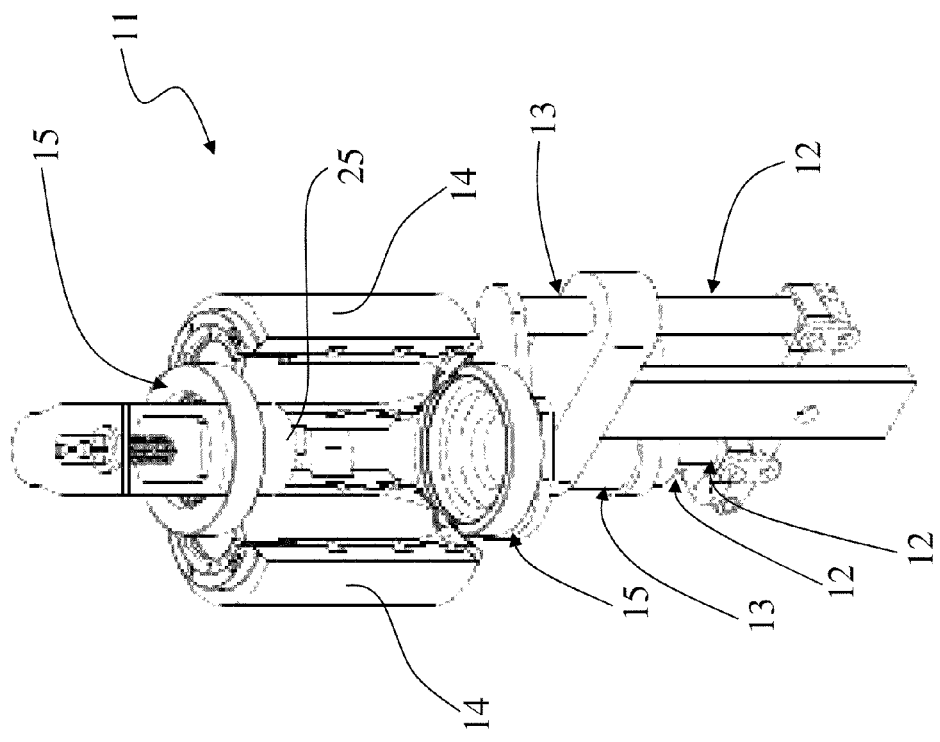
FIG. 5 illustrates a perspective view of the mould of FIG. 4, in a closed position.

In the embodiment described and illustrated here, in the lower zone 26a of the isolation device 6 the seal members 10 are in sliding contact, whereas in the upper zone 26b of the isolation device 6 (in proximity to the outlets 17) the seal members 10 are dry labyrinth seals. The apparatus 1 is provided with moulds 11 fixed to the machine 4. In particular, each mould 11 is formed by two half portions 14, which are relatively movable to each other at least between a closed position and an open position of the mould 11. When the mould 11 is in the closed position (FIG. 5), the two half portions 14 abut so as to define at least a cavity for housing a parison or a molded container 2. When the mould 11 is in the open position (FIG. 4), the two half portions 14 are instead positioned apart so as to permit disengagement of the molded container 2 (or the introduction of a new parison). Each mould 11 is additionally provided with a bottom element 25 cooperating with the half portions 14 in order to shape a bottom of the receptacle. Each mould 11 is provided with locking means 15, which are operatively active on the mould 11 in the closed position. In particular, the locking means 15 are movable between a locking configuration and a release configuration when the mould 11 is in the closed position.

The drive components 5 comprise rods, connecting rods, cams, rollers, motors, pneumatic actuators, hydraulic actuators and other moving parts. In particular, the drive components 5 include drive members 12 for opening and closing the moulds 11. Preferably, the drive components 5 also include drive members for raising and lowering the mould bottom element 25.

Therefore, the opening and closing of the moulds 11 is determined by the opening/closing members 12 (comprising, for example, rods associated therewith) housed within respective tubular bodies 13. The upward or downward movement of the bottom elements 25 is determined by the raising/lowering members (comprising, for example, rods associated therewith) housed within respective tubular bodies 13.

Preferably, the isolation device 6 comprises a section 18 for collecting the liquids used for cleaning or sterilizing the controlled-contamination environment 7. In particular, said collection section 18 is fashioned in the lower zone 26a of the isolation device 6. It is also envisaged that there will be present exhausters for exhausting the vapours generated by the chemical agents used to clean and sterilize the environment or, if sterilizing agents in a gaseous or vapour state are used, for directly exhausting the substances used for sterilization.

Figure 2:
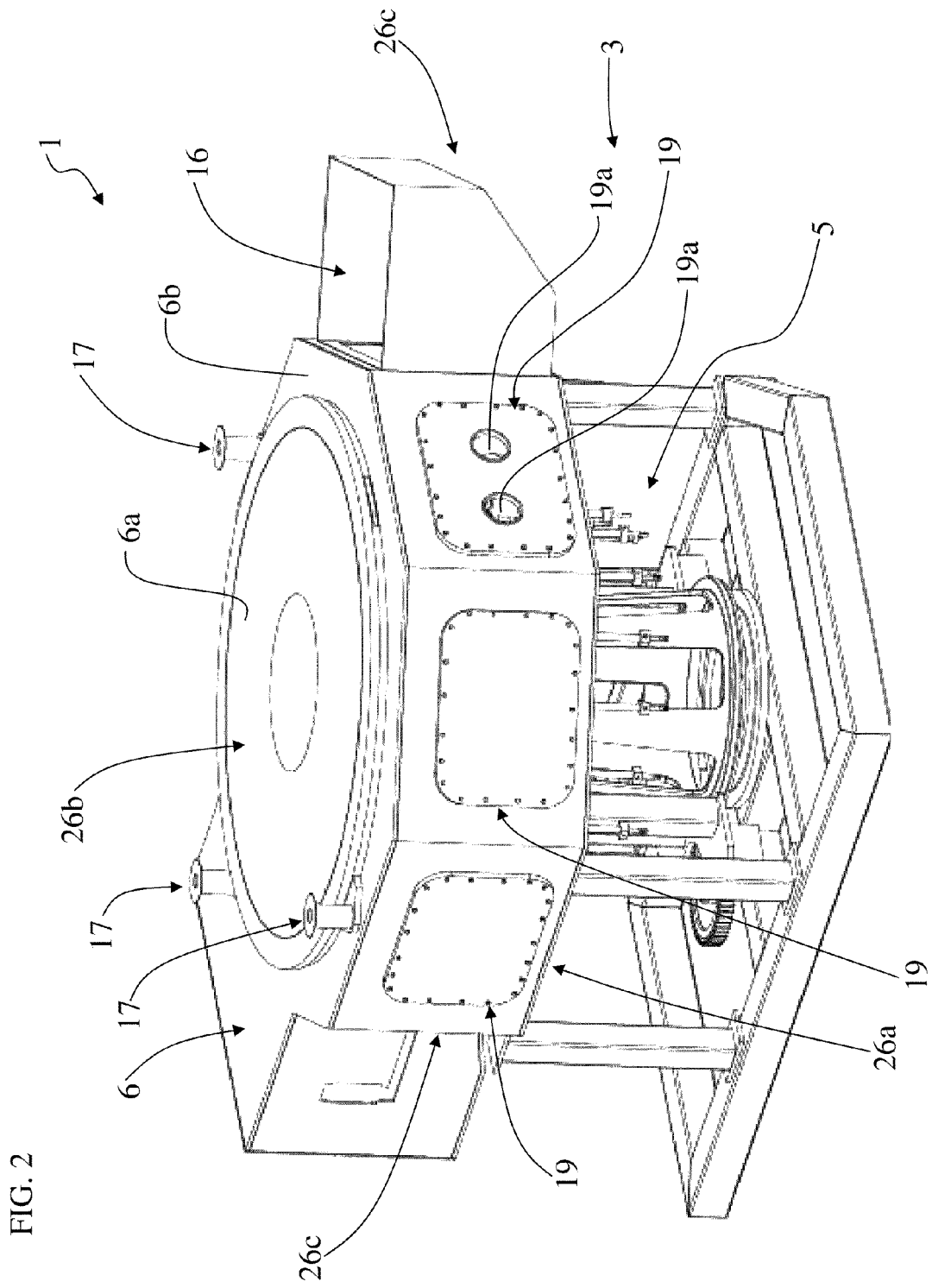
FIG. 2 illustrates a perspective view of the apparatus of FIG. 1.

In the lateral zone 26c of the isolation device 6 there is present at least one service section 19, which is provided with one or more points of access 19a with seal-tight protection in order to allow adjustment, maintenance or size change operations to be performed inside the controlled-contamination environment 7. Preferably, said protected points of access 19 have seal-tight sleeves complete with work gloves. In the embodiment described and illustrated here (see for example FIG. 2), it is envisaged that there will be a plurality of adjacent service sections 19, each having two protected points of access 19a.

Furthermore, inside the isolation device 6 there is present at least one section for storing the tools necessary for the adjustment, maintenance and size change operations. Inside the isolation device 6 there is also fashioned at least one section for storing equipment suitable for monitoring and microbiological sampling of the environment 7.

Figure 6:
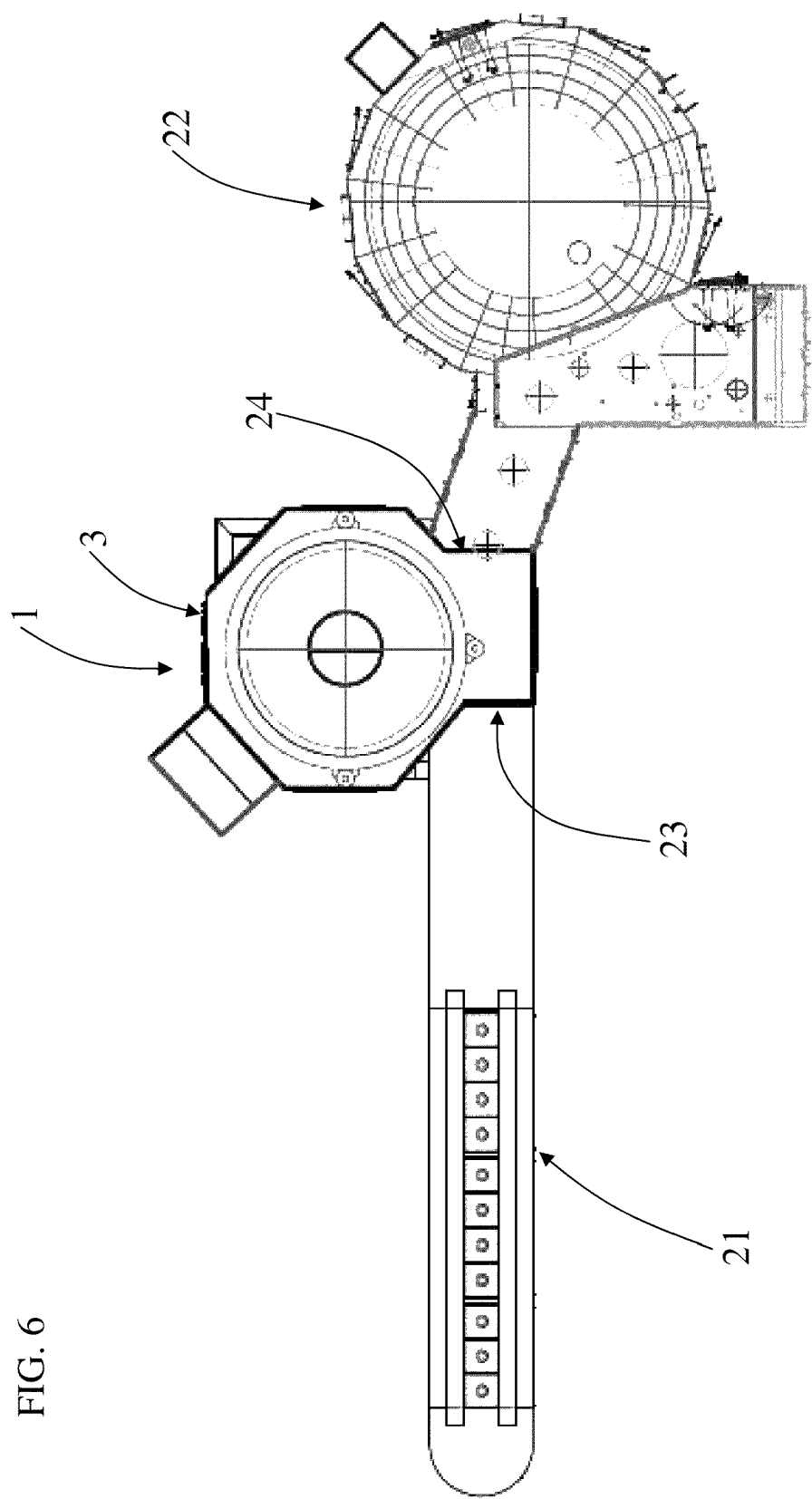
FIG. 6 illustrates a view from above of the apparatus of FIG. 1, connected to a parison treatment station and a receptacle filling station.
Figure 7:
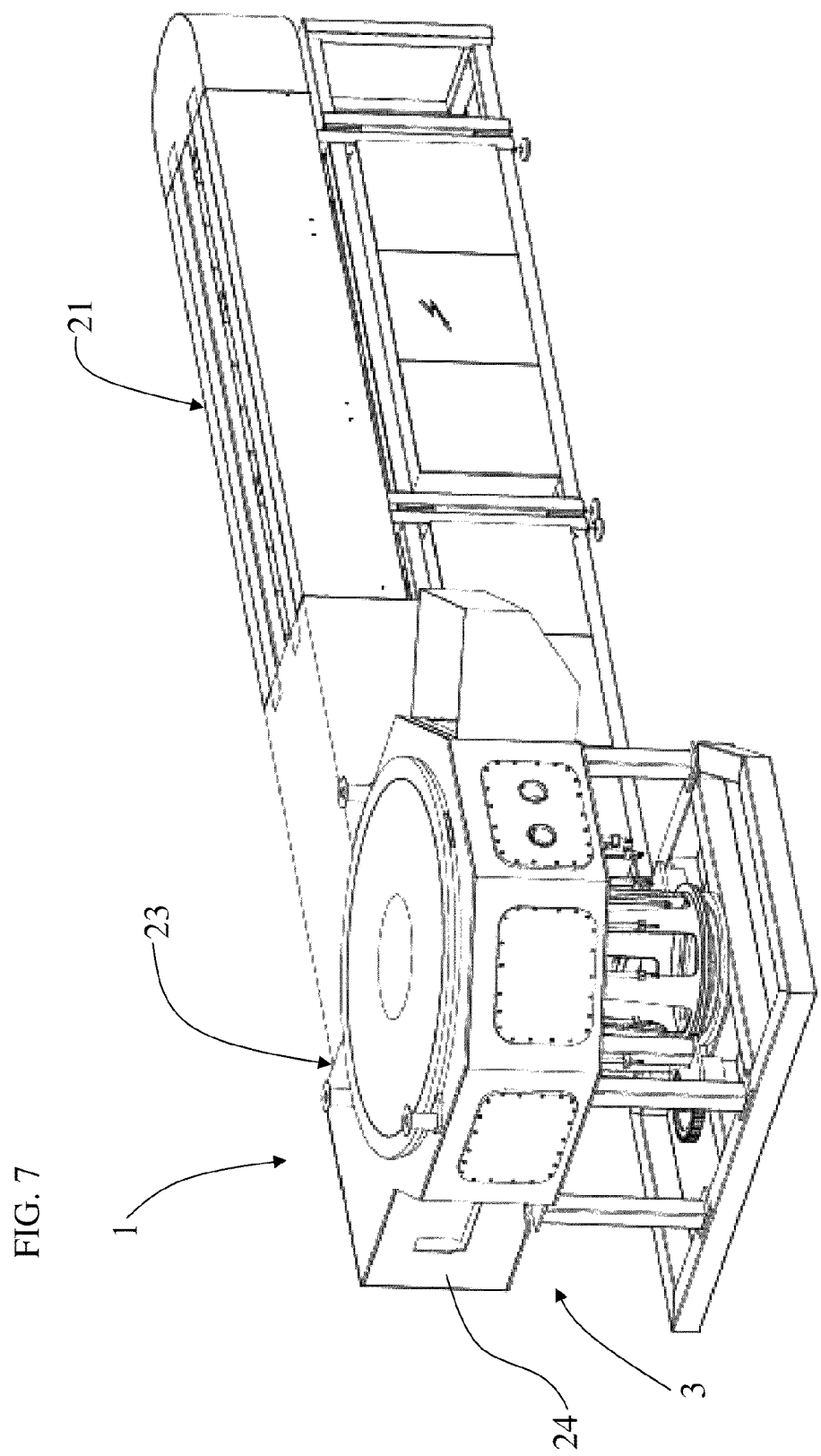
FIG. 7 illustrates a perspective view of the apparatus of FIG. 1, connected to the parison treatment station of FIG. 6.

As can be seen in FIG. 6, the apparatus 1 comprises a parison infeed section 23, connectable (so as to ensure a seal-tight barrier against the outside environment) to a parison treatment station 21 in order to receive the treated parisons. Preferably, the parison treatment station 21 is equipped with an oven for heating the parisons before they are submitted to blowing. The apparatus 1 comprises an outfeed section 24 for the molded containers 2, connectable (so as to ensure a seal-tight barrier against the outside environment) to a station 22 for filling of the receptacles 2.

The functioning of the apparatus for molding containers obtained from parisons, according to the present invention, is described below.

After being heated in the treatment station 21, the parisons are delivered to the molding station 3 through the infeed section 23. The controlled-contamination environment 7 of the molding station 3 has previously undergone C.I.P. and S.I.P. treatments to reduce the presence of bacteria, mould or other contaminating substances. The waste liquids collect in the collection section 18 and are subsequently removed from the isolation device 6, whereas the vapours generated are exhausted.

In the molding station 3 there is present a first carousel (not illustrated) for transferring the parisons to the rotary carousel 20 and a second carousel 28 for transferring the molded containers 2 from said rotary carousel 20 to the filling station 22. Each parison is inserted between the two half portions 14 of the corresponding open mould 11. During this phase, the half portions 14 do not adhere to the parison, which is therefore supported and maintained inside the half portions 14 by means of a dedicated component (not illustrated). The two half portions 14 are brought progressively closer together so as to close the mould 11 and, subsequently, the locking means 15 (consisting, for example, of collars moved by respective rods) go into action. In particular, during the movement of the rotary carousel 20, the opening/closing members 12 of each mould 11 rotate inside the corresponding tubular bodies 13, causing the half portions 14 to move closer together. During the final phase of this mutual approaching, the bottom element 25 of the mould 11 is made to engage with the half portions 14 by virtue of the longitudinal sliding of the raising/lowering member in its corresponding tubular body 13. Once the mould 11 is completely closed, the rods of the locking means 15 slide longitudinally inside the corresponding tubular bodies 13, thereby enabling the mould 11 to be locked in the closed position. In, the end, the mould 11 is closed and the parison is housed inside the cavity defined by the mould 11.

The parison is then processed, for example by stretching and blowing, in order to obtain the receptacle 2.

At the end of the blowing phase, during the rotation of the rotary carousel 20, the rods of the locking means 15 slide longitudinally inside their tubular bodies 13, causing the respective collars to move apart. The opening/closing members 12 of the mould 11 rotate inside the tubular bodies 13, causing the half portions 14 to move apart. The raising/lowering member, which slides longitudinally inside its respective tubular body 13, disengages the bottom element 25 from the half portions 14. In the end, the mould 11 is open and the molded container 2 is grasped and extracted from the mould 11 by means of the dedicated member, which conveys it to the second transfer carousel 28.

The receptacles 2 thus obtained are delivered to the filling station 22 through the outfeed section 24.

The molding of the containers 2 takes place in aseptic conditions since the contamination of the environment 7 is kept under control. If maintenance, adjustment or size change operations need to be performed inside the controlled-contamination environment 7, the operator places his arms inside the sleeves of the protected points of access 19a and, using the work gloves provided, takes hold of the tools disposed in the storage section inside the isolation device 6. The operator can also perform microbiological sampling of the environment 7 by taking hold of the suitable monitoring and sampling equipment.

The characteristics of the apparatus for molding containers obtained from parisons according to the present invention emerge clearly from the description provided, as do the advantages thereof.

In particular, thanks to the fact that the isolation device is applied only to the molding machine (in this case the rotary carousel), the apparatus is compact. Moreover, since the drive components are outside the controlled-contamination environment, any build-up of dirt (dust, lubrication oil) on them will not impact the environment in which the rotary carousel is situated, thus enabling the contamination to be easily maintained within the desired level. This disposition of the drive components further enables operators to carry out maintenance and adjustments on such components without entering the controlled-contamination environment. As a result, the risks of contamination are reduced or even eliminated and the operations can be performed more quickly and easily compared to known solutions.

Furthermore, since maintenance, adjustment and size change operations inside the controlled-contamination environment take place through the protected points of access (with sleeves and work gloves), operators can manually operate inside the environment without coming directly into contact with it. The tools necessary for the operations are moreover already inside the environment, so no persons or tools are ever introduced inside the environment itself. As a result, the risks of contamination are reduced compared to known solutions or even eliminated altogether. The maintaining of environmental contamination within the desired level is also assured by the presence of seal members between the movable portion and fixed portion of the isolation device, as well as the fact that pressure levels are correctly maintained inside the environment.

The reduction in the risks of contamination is closely tied to the system for driving the movement of the moulds. Thanks to the disposition of the tubular bodies partly inside and partly outside the controlled-contamination environment, the mould opening/closing members can rotate inside said bodies without contaminating the environment. Furthermore, the mould bottom element raising/lowering members can slide longitudinally inside their respective tubular bodies without contaminating the environment. The rods of the locking means (i.e. the collars) likewise slide inside respective tubular bodies without contaminating the environment. Obviously, this configuration of the drive components is made possible precisely by the particular configuration of the moulds themselves.

In addition, since operators do not directly access the controlled-contamination environment, it is not necessary to open the isolation device to permit the entry thereof; it is sufficient that the operators introduce their arms into the sleeves of the points of access, which they may do at any time. As a result, the time necessary for the various operations is considerably reduced compared to the known art.

Finally, thanks to the seal-tight connection between the molding station and the parison treatment station and between the molding station and the filling station, it is possible to create an aseptic, controlled-contamination bottling line. Since the molding machine (e.g. blowing machine) is protected by the isolation device, which enables the environmental contamination to be kept under control, it is preferred to sterilize the parisons prior to blowing. This is more convenient and faster than sterilizing the bottles because the parisons have a regular cylindrical shape, are compact and easy to handle and can be easily heated without undergoing deformation.

The invention claimed is:

1. Molding apparatus (1) comprising:
   a molding station (3) equipped with a machine (4) for molding containers (2) obtained from parisons of plastic material and drive components (5) of said machine (4);
   an isolation device (6) for the molding machine (4), serving to define a controlled-contamination environment (7) for housing the machine (4);
   characterized in that said drive components (5) are situated outside said environment (7), and in that the apparatus comprises tubular bodies (13) disposed partly inside and partly outside said environment (7), said tubular bodies (13) defining tubular cavities suitable for the passage of said drive components (5).

2. Apparatus (1) according to claim 1, wherein the isolation device (6) comprises a movable portion (6a) integral with the molding machine (4) and a fixed portion (6b), there being interposed between said portions (6a, 6b) of the isolation device (6) at least one seal member (10).

3. Apparatus (1) according to claim 2, wherein a plurality of seal members (10) are interposed between the movable portion (6a) and the fixed portion (6b) of the isolation device (6).

4. Apparatus (1) according to claim 1, wherein said drive components (5) include drive members (12) for opening and closing moulds (11) fixed to said machine (4).

5. Apparatus (1) according to claim 4, wherein each mould (11) comprises two half portions (14) relatively movable to each other between a closed position and an open position of the mould (11), a bottom element (25) cooperating with the half portions (14) in order to shape the bottom of the receptacle (2) and clamping means (15) for the mould (11), which are movable between a locking configuration and a release configuration when the mould (11) is in the closed position.

6. Apparatus (1) according to claim 1, wherein a gaseous fluid (7) introduced through at least one inlet (16) of the isolation device (6) flows through the controlled-contamination environment and is discharged through at least one outlet (17) of said isolation device (6), said at least one inlet (16) and said at least one outlet (17) of the isolation device (6) being dimensioned according to a predefined mutual ratio so as to maintain the fluid at a predetermined pressure.

7. Apparatus (1) according to claim 6, wherein the isolation device (6) is provided with filters fitted to said at least one inlet (16) in order to filter the gaseous fluid.

8. Apparatus (1) according to claim 2, wherein said at least one seal member (10) is of the sliding contact or mechanical labyrinth type.

9. Apparatus (1) according to claim 1, wherein the isolation device (6) is provided with a section (18) for collecting the liquids used for cleaning and sterilizing the controlled-contamination environment (7).

10. Apparatus (1) according to claim 1, wherein the isolation device (6) is provided with at least one service section (19) having one or more points of access (19a) with seal-tight protection to enable adjustment, maintenance or size change operations to be performed inside the controlled-contamination environment (7).

11. Apparatus (1) according to claim 1, wherein the isolation device (6) is provided with at least one storage section to house the tools necessary for the adjustment, maintenance or size change operations.

12. Apparatus (1) according to claim 1, wherein the isolation device (6) is provided with at least one storage section to house equipment suitable for monitoring and microbiological sampling of said environment (7).

13. Apparatus (1) according to claim 1, wherein said molding machine (4) is of the type with a rotary carousel (20).

14. Apparatus (1) according to claim 1, further comprising a parison infeed section (23) and an outfeed section (24) for the molded containers (2), said infeed section (23) being connectable to a station (21) for treating said parisons so as to receive the treated parisons, said outfeed section (24) being connectable to a station (22) for filling said receptacles (2) in order to transfer thereto the molded containers (2).

* * * * *